United States Patent
Seo et al.

(10) Patent No.: US 9,513,513 B2
(45) Date of Patent: Dec. 6, 2016

(54) LIQUID CRYSTAL DEVICE AND METHOD FOR MANUFACTURING THE SAME

(71) Applicant: Samsung Display Co., Ltd., Yongin (KR)

(72) Inventors: Bong Sung Seo, Suwon-si (KR); Hwa Sung Woo, Asan-si (KR); Baek Kyun Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 78 days.

(21) Appl. No.: 14/616,602

(22) Filed: Feb. 6, 2015

(65) Prior Publication Data

US 2016/0018685 A1   Jan. 21, 2016

(30) Foreign Application Priority Data

Jul. 18, 2014  (KR) .................. 10-2014-0091125

(51) Int. Cl.
    *G02F 1/1337*   (2006.01)
(52) U.S. Cl.
    CPC ... *G02F 1/133788* (2013.01); *G02F 1/133707* (2013.01)
(58) Field of Classification Search
    CPC .................................................. G02F 1/1337
    See application file for complete search history.

(56) References Cited

U.S. PATENT DOCUMENTS

| | | | |
|---|---|---|---|
| 6,063,829 A | 5/2000 | Endou et al. | |
| 2008/0316407 A1* | 12/2008 | Kim .................... | G02F 1/13378 349/124 |

(Continued)

FOREIGN PATENT DOCUMENTS

| | | |
|---|---|---|
| KR | 10-2009-0059458 | 6/2009 |
| KR | 10-2010-0123760 | 11/2010 |

OTHER PUBLICATIONS

D. W. Berreman, "Solid Surface Shape and the Alignment of an Adjacent Nematic Liquid Crystal", Physical Review Letters, Jun. 26, 1972, pp. 1683-1687, vol. 28, No. 26.

(Continued)

*Primary Examiner* — Timothy L Rude
(74) *Attorney, Agent, or Firm* — H.C. Park & Associates, PLC

(57) ABSTRACT

A liquid crystal display according to an exemplary embodiment of the present invention includes: a gate line disposed on a first substrate; a gate insulating layer disposed on the gate line; a semiconductor layer disposed on the gate insulating layer; a data line disposed on the semiconductor layer and including a source electrode; a drain electrode disposed on the semiconductor layer and facing the source electrode via the semiconductor layer interposed therebetween; a passivation layer disposed on the data line and the drain electrode; a pixel electrode disposed on the passivation layer and connected to the drain electrode; a first alignment pattern layer disposed on the pixel electrode; and a first alignment layer disposed on the pixel electrode and the first alignment pattern layer and made of a photoalignment material, wherein the first alignment pattern layer includes a plurality of first alignment patterns separated with a predetermined interval, and the first alignment layer has a concave-convex shape including grooves and protrusions of the first alignment layer.

16 Claims, 10 Drawing Sheets

(56) References Cited

U.S. PATENT DOCUMENTS

| | | | | |
|---|---|---|---|---|
| 2009/0279033 A1* | 11/2009 | Yoneya | ............ | G02F 1/133753 |
| | | | | 349/129 |
| 2011/0043731 A1* | 2/2011 | Shin | ................ | G02F 1/133711 |
| | | | | 349/96 |
| 2014/0085597 A1* | 3/2014 | Katou | ................ | G02B 5/3083 |
| | | | | 349/194 |
| 2014/0313581 A1* | 10/2014 | Kashima | ............. | G02B 5/3016 |
| | | | | 359/489.07 |
| 2016/0060529 A1* | 3/2016 | Hegmann | ............. | C09K 19/52 |
| | | | | 349/123 |

OTHER PUBLICATIONS

J.M. Geary et al., "The Mechanism of Polymer Alignment of Liquid-Crystal Materials", J. Appl. Phys. 62, 4100 (1987).

* cited by examiner

LIQUID CRYSTAL DEVICE AND METHOD FOR MANUFACTURING THE SAME

CROSS-REFERENCE TO RELATED APPLICATION

This application claims priority from and the benefit of Korean Patent Application No. 10-2014-0091125 filed on Jul. 18, 2014, which is incorporated by reference for all purposes as if fully set forth herein.

BACKGROUND

Field

Exemplary embodiments of the present invention relate to a liquid crystal display and a manufacturing method thereof.

Discussion of the Background

Liquid crystal displays (LCDs) are widely used flat panel displays, and include a pair of panels provided with field-generating electrodes and a liquid crystal (LC) layer interposed between the two panels. The LCD displays images by applying signals to the field-generating electrodes to generate an electric field in the LC layer that determines the orientation of LC molecules therein to adjust polarization of incident light.

The liquid crystal display includes a thin film transistor array panel and a common electrode panel facing each other. The thin film transistor array panel includes a gate line transmitting a gate signal, a data line transmitting a data signal and intersecting with the gate line, a thin film transistor connected to the gate line and the data line, and a pixel electrode connected to the thin film transistor. The common electrode panel includes a light blocking member, a color filter, and a common electrode.

Liquid crystal molecules of the liquid crystal display are initially aligned in a predetermined direction by a rubbing process.

As a method to provide a pretilt to the liquid crystal, there are a contact type rubbing method, which includes applying physical pressure to an alignment layer by using a roller, and a photoalignment method, which includes irradiating ultraviolet rays to the alignment layer.

The above information disclosed in this Background section is only for enhancement of understanding of the background of the invention and therefore it may contain information that does not form the prior art that is already known in this country to a person of ordinary skill in the art.

SUMMARY

Exemplary embodiments of the exemplary embodiments of the present invention relates to a liquid crystal display to reduce generation of afterimages by including the photoalignment method when forming the alignment layer.

Additional aspects will be set forth in the detailed description which follows, and, in part, will be apparent from the disclosure, or may be learned by practice of the inventive concept.

A liquid crystal display according to an exemplary embodiment of the present invention includes: a gate line disposed on a first substrate; a gate insulating layer disposed on the gate line; a semiconductor layer disposed on the gate insulating layer; a data line disposed on the semiconductor layer and including a source electrode; a drain electrode disposed on the semiconductor layer and facing the source electrode via the semiconductor layer interposed therebetween; a passivation layer disposed on the data line and the drain electrode; a pixel electrode disposed on the passivation layer and connected to the drain electrode; a first alignment pattern layer disposed on the pixel electrode; and a first alignment layer disposed on the pixel electrode and the first alignment pattern layer and made of a photoalignment material, wherein the first alignment pattern layer includes a plurality of first alignment patterns separated by a predetermined interval, and the first alignment layer has a concave-convex shape including grooves and protrusions of the first alignment patterns.

A manufacturing method of a liquid crystal display according to an exemplary embodiment of the present invention includes: forming a first display panel; forming a second display panel; and combining the first display panel and the second display panel. The forming of the first display panel includes: sequentially forming a gate line, a semiconductor layer, a data line, a drain electrode, a passivation layer, and a pixel electrode on the first substrate; forming a first alignment pattern layer on the passivation layer and the pixel electrode; and forming a first alignment layer on the pixel electrode and the first alignment pattern layer, wherein the first alignment pattern layer includes a plurality of first alignment patterns disposed to be separated by a predetermined interval, and the first alignment layer has a concave-convex shape including grooves and protrusions of the first alignment patterns.

The foregoing general description and the following detailed description are exemplary and explanatory and are intended to provide further explanation of the claimed subject matter

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
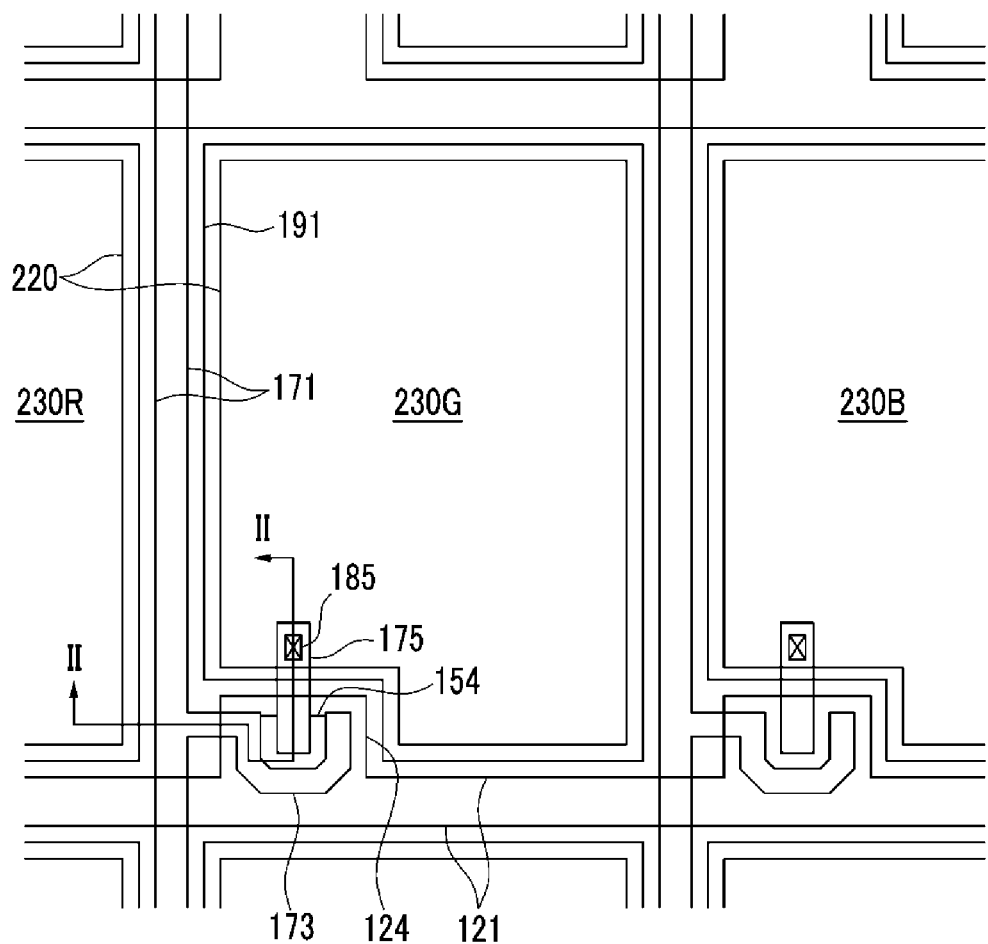
FIG. 1 is a layout view of a liquid crystal display according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
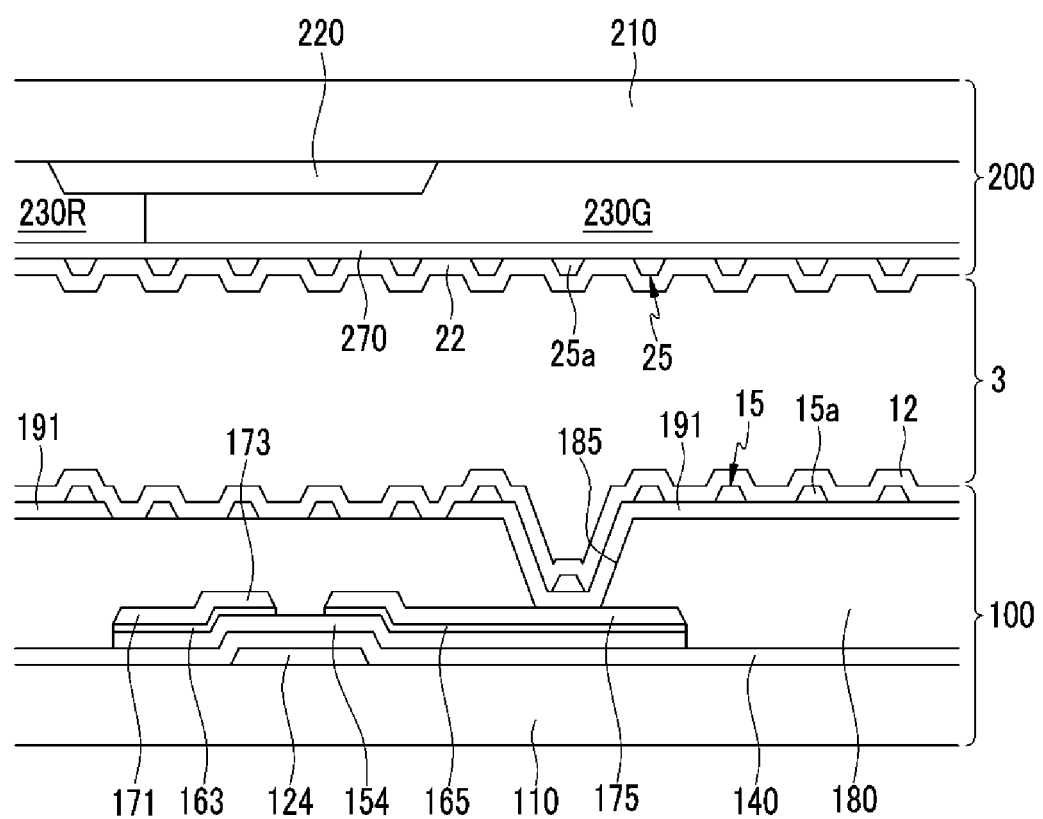
FIG. 2 is a cross-sectional view taken along a line II-II of FIG. 1.

FIG. 1 is a layout view of a liquid crystal display according to an exemplary embodiment of the present invention, and FIG. 2 is a cross-sectional view taken along a line II-II of FIG. 1.

Referring to FIG. 1 and FIG. 2, a liquid crystal display according to an exemplary embodiment of the present invention may include a first display panel 100 and a second display panel 200 facing each other, and a liquid crystal layer 3 interposed therebetween. The liquid crystal layer 3, as shown in FIG. 2, includes a plurality of liquid crystal molecules.

The first display panel 100 of FIG. 2 will be described in the following paragraphs.

A plurality of gate lines 121 are disposed on a first substrate 110, which may be made of an insulating material such as glass or plastic.

The gate lines 121 transmit a gate signal and may mainly extend in a transverse direction. Each gate line 121 includes a plurality of gate electrodes 124 protruding upward.

A gate insulating layer 140 is disposed on the gate lines 121, a semiconductor layer 154 is disposed on the gate insulating layer 140, and a plurality of ohmic contacts, including the first and second ohmic contacts 163 and 165 may be disposed on the semiconductor layer 154.

The semiconductor layer 154 may be made of amorphous silicon, and the first and second ohmic contacts 163 and 165 may be formed of a material such as n+ hydrogenated amorphous silicon in which an n-type impurity is doped at a high concentration, or of a silicide, but it is not limited thereto. The semiconductor 154 together with the ohmic contacts 163 and 165 may be referred to as a semiconductor, and the semiconductor may include a polysilicon semiconductor or an oxide semiconductor.

A plurality of data lines 171, including a plurality of source electrodes 173 extending toward the gate electrode 124, and a plurality of drain electrodes 175, separated from the data lines 171 and facing the source electrodes 173 with respect to the gate electrode 124, may be disposed on the first and second ohmic contacts 163 and 165 and the gate insulating layer 140.

The first and second ohmic contacts 163 and 165 may be disposed between the semiconductor layer 154, the data line 171, and drain electrode 175, and may lower contact resistance therebetween.

One gate electrode 124, one source electrode 173, and one drain electrode 175 may constitute one thin film transistor (TFT) along with the semiconductor 154. The channel of the thin film transistor may be formed on the semiconductors 154 between the source electrode 173 and the drain electrode 175.

A passivation layer 180 is disposed on the gate insulating layer 140, the data line 171, and the drain electrode 175. A contact hole 185 exposing the drain electrode 175 is formed in the passivation layer 180. The passivation layer 180 may be made of an organic insulator, and the surface may be flat.

The passivation layer 180 may have a dual-layer structure including a lower inorganic layer and an upper organic layer so that high insulating characteristics of the organic layer may be ensured and there may be no or less damage to the exposed portions of the semiconductors 154.

A pixel electrode 191 is disposed on the passivation layer 180. The pixel electrode 191 may be made of a transparent conductive material such as indium tin oxide (ITO) or indium zinc oxide (IZO), or a reflective metal such as aluminum or silver, or alloys thereof. The pixel electrode 191 contacts the drain electrode 175 through the contact hole 185.

A first alignment pattern layer 15 is formed on the pixel electrode 191. The first alignment pattern layer 15 may include a plurality of first alignment patterns 15a. A plurality of first alignment patterns 15a may be disposed to be separated by a predetermined interval, and the pitch thereof may be, for example, less than 50 nm. Also, the thickness of the first alignment patterns 15a may be, for example, less than 20 nm. However, aspects of the invention are not limited thereto. Here, the pitch may refer to, without limitation, a sum of a width of one first alignment pattern 15a and an interval between adjacent first alignment patterns 15a.

A first alignment layer 12 is formed or disposed on the pixel electrode 191 and the first alignment pattern layer 15. The first alignment layer 12 may be made of a photoalignment material and formed by irradiating ultraviolet rays.

The second display panel 200 of FIG. 2 will be described in the following paragraphs.

A light blocking member 220 is formed or disposed on a second substrate 210 which may be made of an insulating material such as glass or plastic, but is not limited thereto. Color filters including a red color filter 230R, a green color filter 230G, and a blue color filter 230B are formed or disposed on the light blocking member 220.

A common electrode 270 is formed or disposed on the light blocking member 220 and the red, green, and blue color filters 230R, 230G, and 230B.

A second alignment pattern layer 25 is formed or disposed on the common electrode 270. The second alignment pattern layer 25 may include a plurality of second alignment patterns 25a. A plurality of second alignment patterns 25a may be disposed to be separated from each other by a predetermined interval. The plurality of second alignment patterns 25a are respectively separated by the predetermined interval. The pitch of the second alignment patterns 25a may be, for example, less than 50 nm. In an example, the thickness of the second alignment pattern 25a may be less than 20 nm.

A second alignment layer 22 is formed or disposed on the common electrode 270 and the second alignment pattern layer 25. The second alignment layer 22 may be made of the photoalignment material and may be formed by irradiating ultraviolet rays.

A shape of the first alignment pattern 15a and the second alignment pattern 25a may have a cross-section in the shape of, for example, a quadrangle, a triangle, or a circle, but is not limited thereto.

The first alignment pattern layer 15 and the second alignment pattern layer 25 may form a photosensitive film pattern layer. The photosensitive film pattern layer may be a positive photosensitive film pattern layer or a negative photosensitive film pattern layer.

Also, the first alignment pattern layer 15 and the second alignment pattern layer 25 may each be a pattern layer formed of a polymer such as, for example, a polyimide.

Also, the first alignment pattern layer 15 and the second alignment pattern layer 25 may be a wire grid polarizer (WGP) pattern layer.

The first alignment layer 12 and the second alignment layer 22 respectively may have protrusions and/or depressions including grooves and protrusions formed by the first alignment pattern layer 15 and the second alignment pattern layer 25. An alignment layer irradiated with ultraviolet rays may have a lower anchoring energy than an alignment layer processed with a contact type rubbing process. In an exemplary embodiment, the first alignment layer 12 and the second alignment layer 22 may have the protrusions and/or depressions included in the concave-convex shape, and the alignment may be controlled by the interaction between the grooves and liquid crystal molecules of the liquid crystal layer 3. Accordingly, the generation of afterimages may be reduced.

Also, in an exemplary embodiment, the first alignment layer 12 and the second alignment layer 22 may be formed by irradiating ultraviolet rays such that a scratch or a foreign particle according to the contact rubbing process may not remain on the alignment layer.

Referring to FIGS. 3 to 10 and FIG. 2, a manufacturing method of a liquid crystal display according to an exemplary embodiment of the present invention will be described in the following paragraphs.

FIG. 3 to FIG. 6 are views showing a manufacturing method of a first display panel, and FIG. 7 to FIG. 10 are views showing a manufacturing method of a second display panel according to exemplary embodiments of the present invention.

Figure 3:
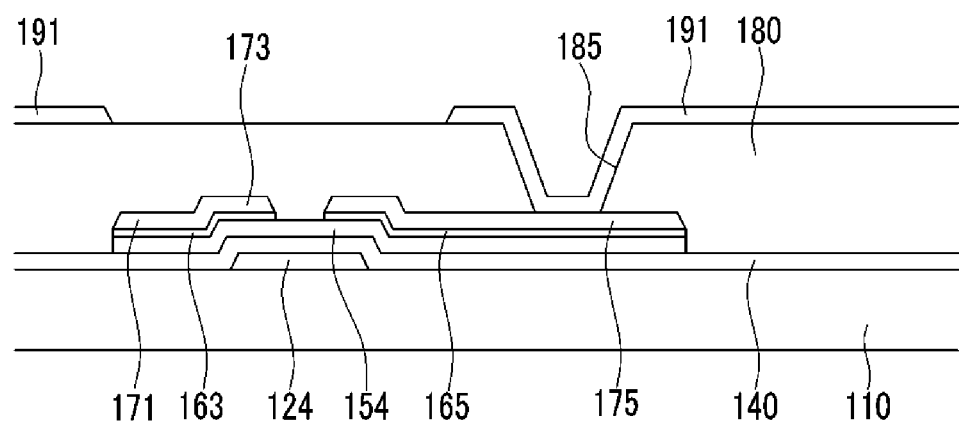
FIG. 3 to FIG. 6 are views showing a manufacturing method of a first display panel according to an exemplary embodiment of the present invention.

Referring to FIG. 3, thin film layers such as a gate line 121 including a gate electrode 124, a gate insulating layer 140, a semiconductor layer 154, ohmic contacts 163 and 165, a data line 171 including a source electrode 173, a drain electrode 175, a passivation layer 180, and a pixel electrode 191 may be formed on a first substrate 110 by using various methods such as thin film deposition, photolithography, photo-etching, etc.

Figure 4:
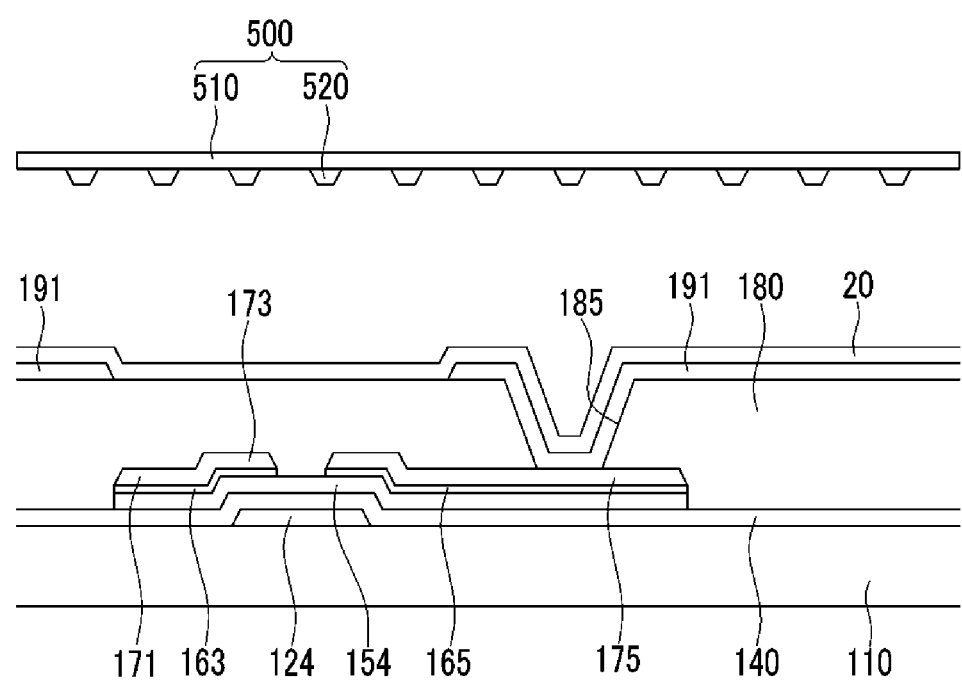

Referring to FIG. 4, after forming a photosensitive film 20 on the pixel electrode 191 and the passivation layer 180, an exposure process of irradiating ultraviolet rays to the photosensitive film 20 may be executed. The photosensitive film 20 may be a positive photosensitive film. However, aspects of the invention are not limited thereto, and the photosensitive film 20 may be a negative photosensitive film as further explained below.

The exposure process may use a mask 500. The mask 500 may include a transparent layer 510 and a light blocking layer 520. The light blocking layer 520 is formed on portions of the transparent layer 510. When irradiating ultraviolet rays, the ultraviolet rays may not be transmitted on the portion in which the light blocking layer 520 is disposed, while ultraviolet rays may be transmitted on the portion on which the light blocking layer 520 is not disposed. Ultraviolet rays passing through the mask 500 may be radiated to the photosensitive film 20 and the portion of the photosensitive film 20 irradiated with ultraviolet rays may be hardened.

Figure 5:
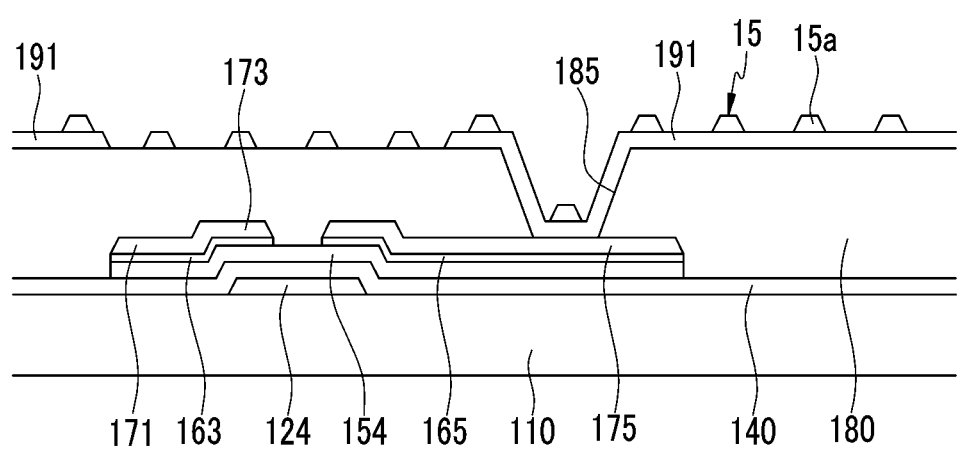

Referring to FIG. 5, the first alignment pattern layer 15 is formed on the pixel electrode 191 and the passivation layer 180. The first alignment pattern layer 15 may include a plurality of first alignment patterns 15a.

If the photosensitive film 20 is developed, the portion that is not irradiated by ultraviolet rays may be removed while the portion irradiated by the ultraviolet rays may remain. The portion that remain may form the first alignment pattern 15a. In an example, the pitch of the first alignment patterns 15a may be less than 50 nm and that the thickness of the first alignment pattern 15a may be less than 20 nm, however, aspects of the invention are not limited thereto.

Referring to FIG. 4 and FIG. 5, a positive photosensitive film may be used, however, it is not limited thereto, and a negative photosensitive film may be used. When using the negative photosensitive film, after the development, the portion irradiated with ultraviolet rays may be removed, while the portion that is not irradiated with ultraviolet rays may remain, and may form the first alignment patterns 15a.

Also, instead of a photosensitive film 20 a polymer material such as a polyimide may be used. After forming the polymer material layer, the photosensitive film pattern may be formed on the polymer material layer. The polymer material layer may then be etched by using the photosensitive film pattern as a mask to form the first alignment patterns 15*a*.

Figure 6:
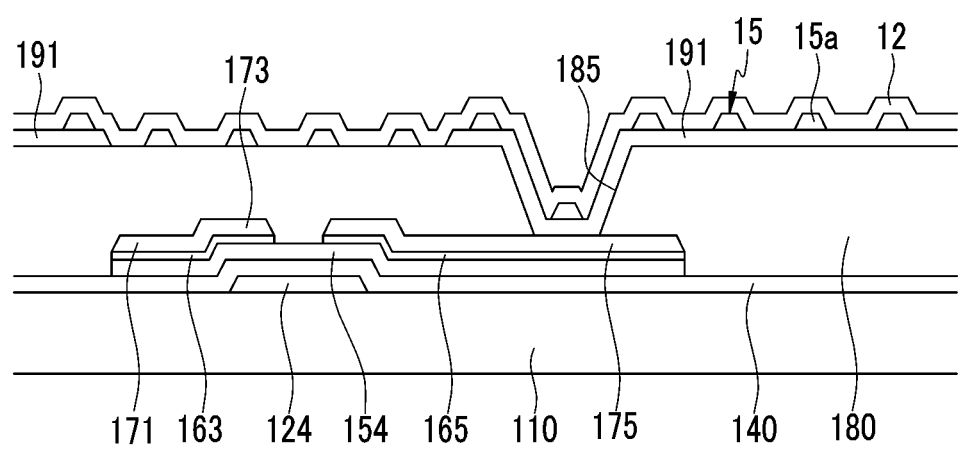

Referring to FIG. 6, the photoalignment material layer is formed on the pixel electrode 191 and the first alignment pattern layer 15, and ultraviolet rays may be irradiated to form the first alignment layer 12. The first alignment layer 12 may have the concave-convex shape including the grooves and the protrusions formed by the first alignment pattern layer 15.

Figure 7:
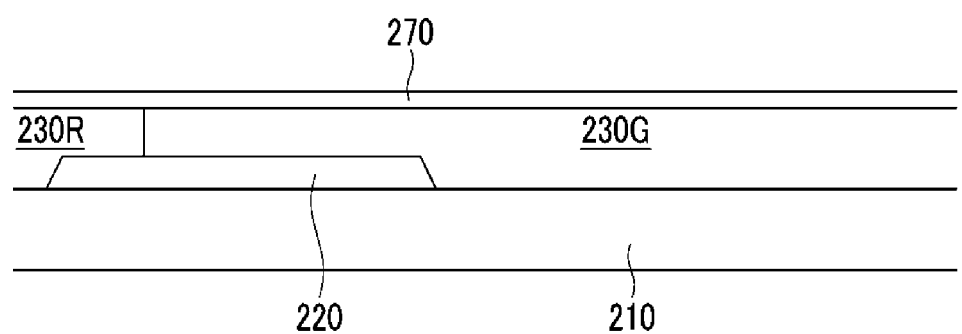
FIG. 7 to FIG. 10 are views showing a manufacturing method of a second display panel according to an exemplary embodiment of the present invention.

Referring to FIG. 7, thin films such as a light blocking member 220, red, green, and blue color filters 230R, 230G, and 230B, and a common electrode 270 may be formed on a second substrate 210 by using various methods such as thin film deposition, photolithography, and photo-etching, etc.

Figure 8:
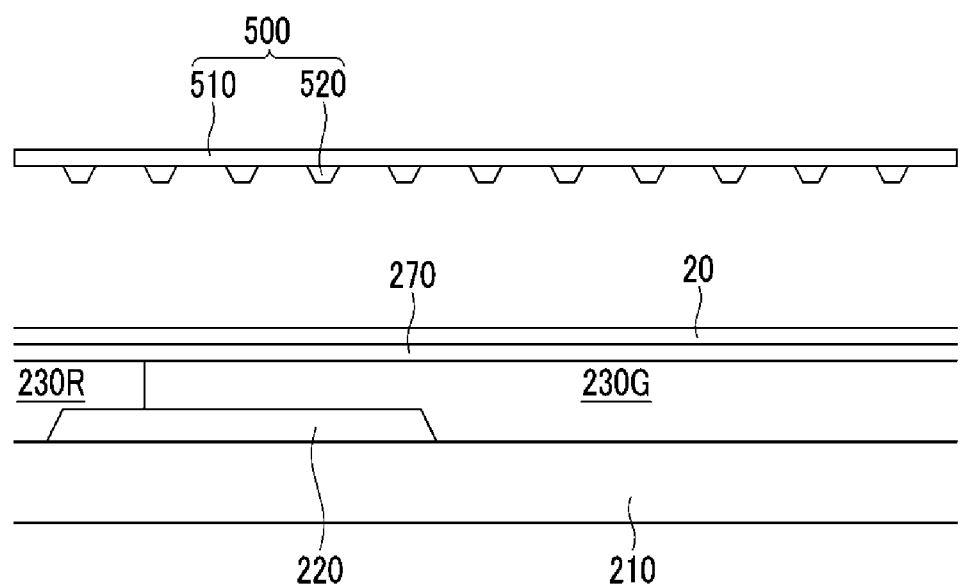

Referring to FIG. 8, after forming a photosensitive film 20 on the common electrode 270, an exposure process of irradiating ultraviolet rays to the photosensitive film 20 may be executed.

Referring to FIG. 8, the photosensitive film 20 may be a positive photosensitive film, but is not limited thereto.

The exposure process may use the mask 500. The mask 500 may include the transparent layer 510 and the light blocking layer 520. The light blocking layer 520 is formed on portions of the transparent layer 510. When irradiating ultraviolet rays, ultraviolet rays are not transmitted on the portion in which the light blocking layer 520 is disposed, while ultraviolet rays are transmitted on the portion on which the light blocking layer 520 is not disposed. Ultraviolet rays passing through the mask 500 may be radiated to the photosensitive film 20, and the portion of the photosensitive film 20 irradiated with ultraviolet rays may be hardened.

Figure 9:
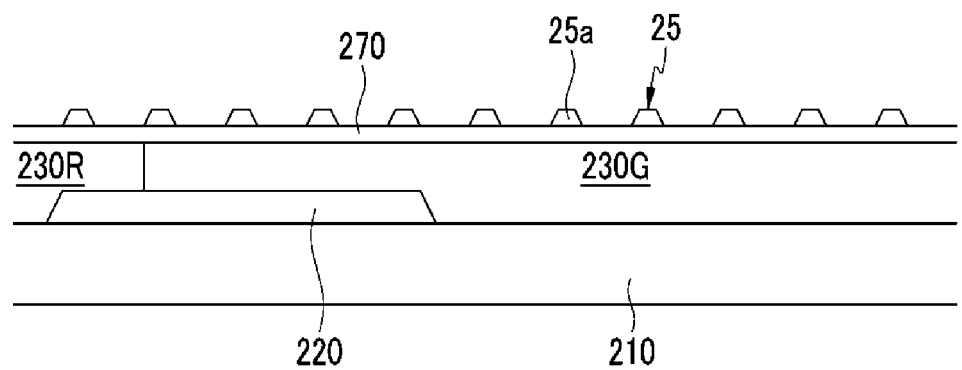

Referring to FIG. 9, a second alignment pattern layer 25 is formed on the common electrode 270. The second alignment pattern layer 25 may include a plurality of second alignment patterns 25*a*.

If the photosensitive film 20 is developed, the portion that is not irradiated by ultraviolet rays may be removed, while the portion irradiated by the ultraviolet rays may remain. The portions that remain may form the second alignment pattern 25*a*. In an example, the pitch of the second alignment patterns 25*a* may be less than 50 nm and that the thickness of the first alignment pattern 15*a* may be less than 20 nm.

Referring to FIG. 8 and FIG. 9, the positive photosensitive film may be used, however, it is not limited thereto, and the negative photosensitive film may be used. When using the negative photosensitive film, after the development, the portion irradiated with ultraviolet rays is removed and the portion that is not irradiated with ultraviolet rays remains, and may form the first alignment patterns 15*a*.

Also, when a polymer material such as a polyimide is used, after forming the polymer material layer, the photosensitive film pattern may be formed on the polymer material layer. The polymer material layer may then be etched by using the photosensitive film pattern as a mask to form the second alignment patterns 25*a*.

Figure 10:
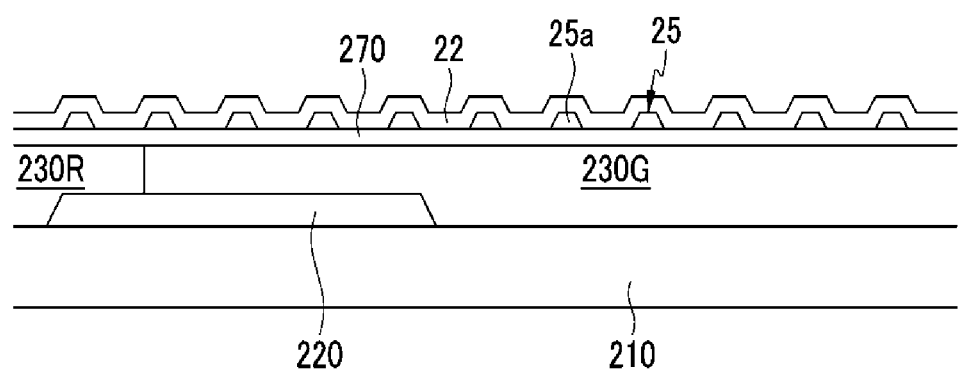

Referring to FIG. 10, the photoalignment material layer is formed on the common electrode 270 and ultraviolet rays may be radiated to form the second alignment layer 22. The second alignment layer 22 may have the concave-convex shape including the grooves and the protrusions formed by the second alignment pattern layer 25.

Referring to FIG. 2, after combining the first display panel 100 and the second display panel 200, liquid crystal molecules may be injected between the first display panel 100 and the second display panel 200 to form the liquid crystal layer 3. For the formation of the liquid crystal layer 3, the liquid crystal molecules may be dripped on the first display panel 100 or the second display panel 200, and then the first display panel 100 and the second display panel 200 may be combined to face each other.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display comprising:
   a gate line disposed on a first substrate;
   a gate insulating layer disposed on the gate line;
   a semiconductor layer disposed on the gate insulating layer;
   a data line, comprising a source electrode, disposed on the semiconductor layer;
   a drain electrode disposed on the semiconductor layer, the drain electrode facing the source electrode via the semiconductor layer interposed therebetween;
   a passivation layer disposed on the data line and the drain electrode;
   a pixel electrode, connected to the drain electrode, disposed on the passivation;
   a first alignment pattern layer disposed on the pixel electrode; and
   a first alignment layer disposed on the pixel electrode and the first alignment pattern layer, the first alignment layer comprising a photoalignment material,
   wherein the first alignment pattern layer comprises a plurality of first alignment patterns separated by a predetermined interval, and
   the first alignment layer is configured in a concave-convex shape including grooves and protrusions.

2. The liquid crystal display of claim 1, wherein a pitch of the first alignment patterns is less than 50 nm, and a thickness of the first alignment pattern is less than 20 nm.

3. The liquid crystal display of claim 1, further comprising:
   a second substrate facing the first substrate;
   a color filter disposed on the second substrate;
   a common electrode disposed on the color filter;
   a second alignment pattern layer disposed on the common electrode; and
   a second alignment layer, comprising the photoalignment material, disposed on the common electrode,
   wherein the second alignment pattern layer comprises a plurality of second alignment patterns separated by a predetermined interval, and
   the second alignment layer is configured in the concave-convex shape including the grooves and the protrusions.

4. The liquid crystal display of claim 3, wherein the pitch of the second alignment patterns is less than 50 nm, and the thickness of the second alignment pattern is less than 20 nm.

5. The liquid crystal display of claim 4, wherein the first alignment pattern and the second alignment pattern comprise a photosensitive film pattern.

6. The liquid crystal display of claim 4, wherein the first alignment pattern and the second alignment pattern comprise a polymer pattern.

7. The liquid crystal display of claim 4, wherein the first alignment pattern and the second alignment pattern comprise a wire grid pattern.

8. A method for manufacturing a liquid crystal display, comprising:
forming a first display panel;
forming a second display panel; and
combining the first display panel and the second display panel,
wherein the forming of the first display panel comprises:
sequentially disposing a gate line, a semiconductor layer, a data line, a drain electrode, a passivation layer, and a pixel electrode on the first substrate;
disposing a first alignment pattern layer on the passivation layer and the pixel electrode; and
disposing a first alignment layer on the pixel electrode and the first alignment pattern layer,
wherein the first alignment pattern layer comprises a plurality of first alignment patterns separated by a predetermined interval, and
the first alignment layer is configured in a concave-convex shape including grooves and protrusions.

9. The method of claim 8, wherein a pitch of the first alignment patterns is less than 50 nm, and a thickness of the first alignment pattern is less than 20 nm.

10. The method of claim 9, wherein disposing the first alignment pattern layer comprises:
disposing a photosensitive film on the passivation layer and the pixel electrode;
irradiating ultraviolet rays to the photosensitive film by using a mask, the mask comprising a transparent layer and a light blocking layer; and
developing the photosensitive film.

11. The method of claim 10, wherein disposing the first alignment layer comprises:
disposing a photoalignment material layer on the pixel electrode and the first alignment pattern layer; and
radiating ultraviolet rays to the photoalignment material layer.

12. The method of claim 8, wherein the forming of the second display panel comprises:
sequentially disposing a color filter and a common electrode on a second substrate;
disposing a second alignment pattern layer on the common electrode; and
disposing a second alignment layer on the common electrode and the second alignment pattern layer.

13. The method of claim 12, wherein the second alignment pattern layer comprises a plurality of second alignment patterns separated by a predetermined interval, and
the second alignment layer is configured in the concave-convex shape including the grooves and the protrusions.

14. The method of claim 13, wherein the pitch of the second alignment patterns is less than 50 nm, and the thickness of the second alignment pattern is less than 20 nm.

15. The method of claim 14, wherein the disposing of the second alignment pattern layer comprises:
disposing photosensitive film on the common electrode;
radiating ultraviolet rays to photosensitive film by using a mask, the mask comprising a transparent layer and a light blocking layer; and
developing the photosensitive film irradiated with ultraviolet rays.

16. The method of claim 15, wherein the disposing of the second alignment layer comprises:
disposing a photoalignment material layer on the common electrode and the first alignment pattern layer; and
radiating ultraviolet rays to the photoalignment material layer.

* * * * *